United States Patent [19]

Andrä et al.

[11] Patent Number: 4,700,934
[45] Date of Patent: Oct. 20, 1987

[54] PRETENSIONABLE AND HYDRAULICALLY DAMPED MOUNTING ELEMENT

[75] Inventors: Rainer Andrä, Limburg; Manfred Hofman, Hünfelden, both of Fed. Rep. of Germany

[73] Assignee: Metzeler Kautschuk GmbH, Munich, Fed. Rep. of Germany

[21] Appl. No.: 854,124

[22] Filed: Apr. 21, 1986

[30] Foreign Application Priority Data

Apr. 19, 1985 [DE] Fed. Rep. of Germany ....... 3514268

[51] Int. Cl.$^4$ .................... F16M 15/04; F16M 13/00; F16F 7/00
[52] U.S. Cl. ................................ 267/140.1; 248/562; 267/141.2
[58] Field of Search ...................... 267/57.1 R, 57.1 A, 267/140.1, 140.2, 141.1, 63 R, 153, 141.2, 113; 16/2; 403/225; 248/562, 609, 636, 638; 384/140, 222, 234, 296; 280/673

[56] References Cited

U.S. PATENT DOCUMENTS

| | | | |
|---|---|---|---|
| 3,135,506 | 6/1964 | Wigan | 267/63 R X |
| 4,262,886 | 4/1981 | Le Salver et al. | 267/63 R X |
| 4,377,216 | 3/1983 | Ueno | 267/140.1 X |
| 4,471,935 | 9/1984 | Chiba et al. | 267/141.2 X |
| 4,588,174 | 5/1986 | Konishi | 267/140.1 |

FOREIGN PATENT DOCUMENTS

| | | |
|---|---|---|
| 2755117 | 6/1979 | Fed. Rep. of Germany . |
| 2841505 | 3/1980 | Fed. Rep. of Germany . |
| 0094147 | 6/1982 | Japan ........... 267/140.1 |
| 0037349 | 2/1984 | Japan ........... 267/140.1 |

Primary Examiner—Andres Kashnikow
Assistant Examiner—Robert J. Oberleitner
Attorney, Agent, or Firm—Herbert L. Lerner; Laurence A. Greenberg

[57] ABSTRACT

A pretensionable and hydraulically damped mounting element with an outer mounting sleeve, and an inner part which is held by an elastomeric body in the interior of the outer mounting sleeve, the elastomeric body above and below the inner part being formed with chambers serving as a mechanical spring and being filled with hydraulic fluid and connected to one another via a channel includes end caps located at respective end faces of the mounting element and being formed of elastic, deformable elastomeric material, the elastomeric body extending from the inner part substantially radially outwardly towards opposite sides of the outer mounting sleeve, the elastomeric body and at least one of the end caps defining the channel therebetween, the channel having a varying cross section.

4 Claims, 4 Drawing Figures

PRETENSIONABLE AND HYDRAULICALLY DAMPED MOUNTING ELEMENT

The invention relates to a pretensionable and hydraulically damped mounting element with an outer mounting sleeve, and an inner part held by an elastomeric body in the interior of the outer mounting sleeve, the elastomeric body above and below this inner part being formed with chambers serving as a mechanical spring, and being filled with an hydraulic fluid, and connected to one another via a channel.

Mounting elements of this general type, such as are disclosed in German Pat. No. 27 55 117, for example, serve to reduce and to prevent the transmission of sound through solid materials and vibrations, for example, between a running engine and a chassis of a motor vehicle. Due to the geometrical configuration of the mechanical construction such mounts are generally soft for small vibration amplitudes, while progressively limiting large vibration amplitudes.

Furthermore, it has become known heretofore from German Pat. No. 28 41 505 to fill the spaces or recesses provided for the free spring travel path with an hydraulic fluid, these spaces or recesses being connected to one another via corresponding channels. A predeterminable damping effect can thereby be assured.

Because of the constant cross section of the overflow channels of the conventional mounting elements additionally damped with hydraulic fluid, a change in the damping behavior is possible only within narrow limits, which are markedly independent of the occurring amplitudes.

It is accordingly an object of the invention to provide a pretensionable and additionally hydraulically damped mounting element, the damping of which can be adjusted to different values dependent upon the respectively occurring amplitude. Furthermore, a wide band reduction of the dynamic stiffness in the acoustic frequency range is to be made possible.

With the foregoing and other objects in view, there is provided, in accordance with the invention, a pretensionable and hydraulically damped mounting element with an outer mounting sleeve, and an inner part which is held by an elastomeric body in the interior of the outer mounting sleeve, the elastomeric body above and below the inner part being formed with chambers serving as a mechanical spring and being filled with hydraulic fluid and connected to one another via a channel, comprising end caps located at respective end faces of the mounting element and being formed of elastic, deformable elastomeric material, the elastomeric body extending from the inner part substantially radially outwardly towards opposite sides of the outer mounting sleeve, the elastomeric body and at least one of the end caps defining the channel therebetween, the channel having a varying cross section.

Due to this construction of the end caps formed of an elastically deformable material and applied to the end faces of the mounting element, wall parts of these caps expand and bulge out differently depending upon the loading of the mounting element and the magnitude of the then occurring amplitudes, respectively, so that a different channel cross section with respect to the inner elastomeric body is produced.

In accordance with another feature of the invention, the end caps are formed with an outer and an inner ring of rigid material, and an annular wall part of elastomeric material disposed between and vulcanized to the outer and inner rings.

In accordance with a further feature of the invention and, in order to attain different damping characteristics, the annular elastomer wall part is provided with a varying cross section over the circumference thereof.

In accordance with a concomitant feature of the invention, the annular wall part, in vicinity of the chamber formed below the inner part has a wall thickness which is smaller than the wall thickness in the remaining part of the circumference of the annular wall part.

Other features which are considered as characteristic for the invention are set forth in the appended claims.

Although the invention is illustrated and described herein as embodied in a pretensionable and hydraulically damped mounting element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
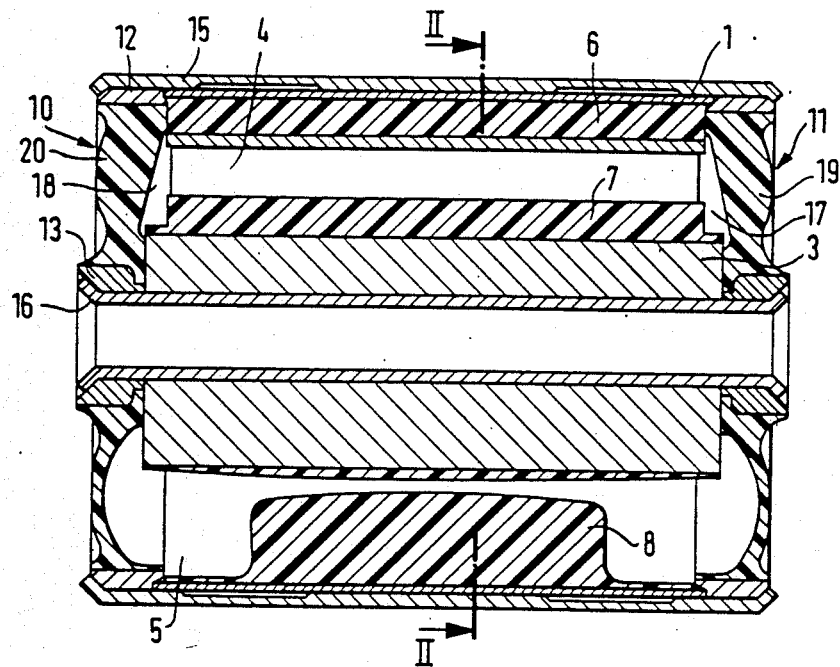
FIG. 1 is a longitudinal sectional view, taken along a vertical plane, through the mounting element according to the invention.
Figure 2:
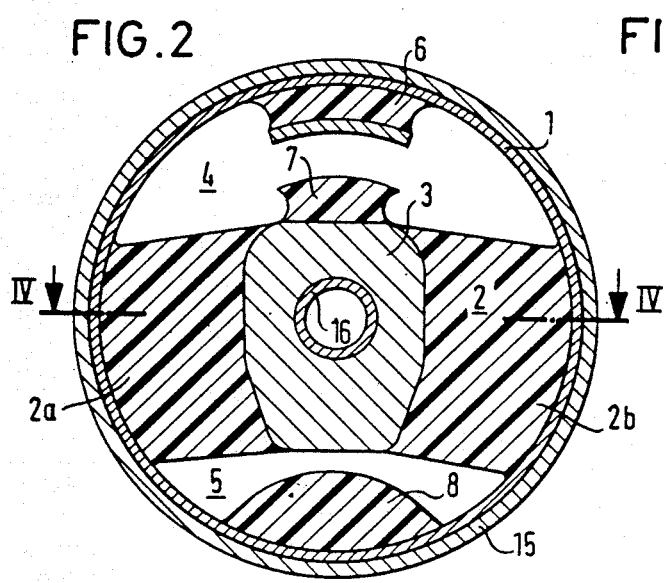
FIG. 2 is a cross-sectional view of FIG. 1 taken along the section line II—II in the direction of the arrows.
Figure 4:
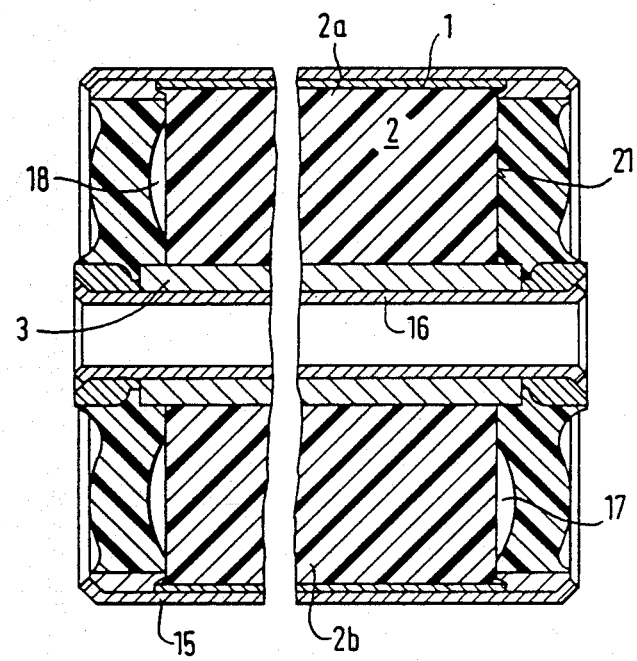
FIG. 4 is a longitudinal sectional view of FIG. 2 taken along the horizontal section line IV—IV in the direction of the arrows.

Referring now to the drawing and first, particularly, to FIGS. 1, 2 and 4 thereof, there is shown a mounting element according to the invention which is formed of a mounting sleeve 1 into which an elastomeric body 2 is vulcanized. This elastomer body 2 is formed of radially inclined rubber support arms 2a and 2b carrying in the middle therebetween an inner mounting or bearing bushing 3. In the illustrated embodiment, the mounting bushing 3 has a somewhat trapezoidal outer cross section, but can also be formed of a smooth or polished tube. The rubber arms 2a and 2b define an upper hollow chamber 4 and a lower hollow chamber 5 within the mounting sleeve 1. A stop 6 formed of elastomeric material with a corresponding counterpart 7 can be vulcanized, respectively, to the mounting sleeve 1 and the bushing 3 in the upper hollow chamber 4, and an additional stop 8 of elastomeric material can be vulcanized to the mounting sleeve in the lower hollow chamber 5.

The mounting element is shown in the figures in pretensioned state; in nonpretensioned state, the stop 7 would be in contact with the stop 6.

Figure 3:
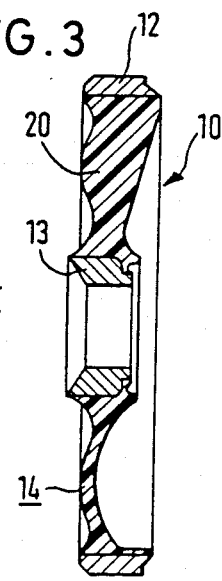
FIG. 3 is a fragmentary view of FIG. 1 showing one of the end-caps forming part of the mounting element.

This conventional mounting element, which could also have some other configuration although based upon the same principle, for the purpose of making it an hydraulically damped support, is provided at its end faces with respective caps 10 and 11 which, according to the longitudinal sectional view in FIG. 3, is formed of an outer ring 12, and an inner ring 13 concentric therewith and between which an annular wall part 14 formed of elastomeric material is vulcanized. These two caps 10 and 11 are placed laterally onto the mounting element and are fluid-tightly clamped to the actual mounting element by an outer ring 15 and a tubular inner bushing 16.

The hollow chambers or spaces 4 and 5 are closed to the outside, are filled with an hydraulic liquid, and are connected to one another by respective annular channels 17 and 18 between the caps 10 and 11, on the one hand, and the actual mounting element or the rubber support arms thereof.

With suitable loading of the mounting element, and due to the vibrations introduced into the latter, respectively, the liquid is displaced from the upper chamber 4 into the lower chamber 5 and vice versa through the channels 17 and 18, respectively, the resistance to flow by the overflow channels 17 and 18 effecting additional damping.

Due to the fact that when the mounting element is loaded or stress relieved in accordance with the occurring vibration amplitudes, walls 19 and 20 expand or contract i.e. bulge outwardly or inwardly, in different ways, the cross section of the over-flow channels 17 and 18 is increased or decreased in dependence upon the amplitude. The damping of the mounting element can thereby be set smaller for certain amplitudes, and greater for others. In this regard, through special configurations of the caps 10 and 11, the most varied possibilities are provided. Thus, the elastomeric walls 19 and 20, respectively, can have a different cross section over the circumference thereof, as shown in the longitudinal sectional views according to FIGS. 1 and 3 as well as FIG. 4. In the illustrated embodiment wherein the wall parts 19 and 20 defining the chamber 5 are thinner than in the upper region, these wall parts 19 and 20 can bulge out more easily as pressure builds up in chamber 5. Due to this configuration, a broad band reduction of the dynamic stiffness of the mounting element in the acoustic frequency range is made possible, the dynamic stiffness being reduced to lower frequencies, for example for a thinner wall.

A further possibility for influencing damping lies in the possibility of keeping only certain overflow channels open, as shown in the longitudinal cross-sectional view of FIG. 4. For example, overflow channels 18 may only be provided at one end face, or only one flow channel 17 remains open at one end face while, through a suitable configuration of the wall, for example, at the location 21, the material of the cap lies directly against the inner elastomeric body.

In summary, there is thus described an hydraulically damped, bushing-shaped mounting element with an amplitude-dependent channel cross section and frequency-coupling side walls which, due to relatively simple form or configuration elements, has a great range of variations with respect to the damping which is to be achieved, and a broad-band reduction of the dynamic stiffness.

We claim:

1. Pretensionable and hydraulically damped mounting element with an outer metallic mounting sleeve, and an inner metallic bushing which are mutually connected by opposite, substantially radially extending elastomeric bridges vulcanized thereto, the elastomeric bridges at least partly defining respective chambers located at opposite sides of the inner bushing and serving as a mechanical spring, the chambers being filled with hydraulic fluid, comprising separate end caps located at respective end faces of the mounting element and closing off the chambers, said end caps being formed of elastic, deformable elastomeric material, said separate end caps having different cross sections varying over the circumferences thereof, both in circumferential direction as well as in radial direction, and defining with respective end faces of the elastomeric bridges overflow channels connecting the chambers and having a cross section varying in accordance with respective strokes imparted to the mounting element.

2. Mounting element according to claim 1, wherein said end caps are formed with an outer and an inner ring of rigid material, and an annular wall part of elastomeric material disposed between and vulcanized to said outer and inner rings.

3. Mounting element according to claim 1, wherein said annular elastomeric wall part has a varying cross section over the circumference thereof.

4. Mounting element according to claim 3, wherein said annular wall part, in vicinity of the chamber formed below the inner bushing has a wall thickness which is smaller than the wall thickness in the remaining part of the circumference of said annular wall part.

* * * * *